United States Patent
Wilcox et al.

[11] Patent Number: 6,145,539
[45] Date of Patent: Nov. 14, 2000

[54] BALANCED COUPLING WITH PRESSURE BLEED

[75] Inventors: Wayne Wilcox, Waterford; Douglas F. Hopson, Union City, both of Pa.

[73] Assignee: Snap-Tite Technologies, Inc., Wilmington, Del.

[21] Appl. No.: 09/290,725

[22] Filed: Apr. 12, 1999

[51] Int. Cl.[7] .................................................. F16L 29/00
[52] U.S. Cl. .................................. 137/614.03; 251/149.6
[58] Field of Search ..................... 137/614.03, 614.04; 251/149.1, 149.6

[56] References Cited

U.S. PATENT DOCUMENTS

| | | | |
|---|---|---|---|
| 2,753,195 | 7/1956 | Palmer | 137/614.03 |
| 3,498,324 | 3/1970 | Breuning . | |
| 4,077,433 | 3/1978 | Maldavs . | |
| 4,249,572 | 2/1981 | Shindelar et al. . | |
| 4,303,098 | 12/1981 | Shindelar . | |
| 4,533,115 | 8/1985 | Lissau . | |
| 4,598,896 | 7/1986 | Maldavs . | |
| 4,614,348 | 9/1986 | Fournier | 277/188 A |
| 4,881,573 | 11/1989 | Durant et al. . | |
| 5,063,965 | 11/1991 | Wilcox . | |
| 5,072,755 | 12/1991 | Wilcox et al. . | |
| 5,123,446 | 6/1992 | Haunhorst et al. | 137/614.02 |
| 5,159,955 | 11/1992 | Ekman . | |
| 5,415,440 | 5/1995 | Kanao . | |
| 5,429,553 | 7/1995 | Schoeps . | |
| 5,592,970 | 1/1997 | Stucchi et al. . | |
| 5,644,832 | 7/1997 | Kanao . | |
| 5,730,185 | 3/1998 | Wilkins et al. . | |
| 5,879,010 | 3/1999 | Nikanth et al. | 277/545 |
| 5,937,899 | 8/1999 | Zeiber | 137/614 |
| 6,026,857 | 2/2000 | Stucchi | 137/614.03 |

*Primary Examiner*—John Fox
*Attorney, Agent, or Firm*—Woodling, Krost and Rust

[57] ABSTRACT

A coupling having two coupler halves, a female half a male half is disclosed. Pressure will be applied to either half but not both. The female half employs a balanced seal arrangement. Each elastomeric seal of the female half is supported, by a support seal. One elastomeric seal of the female is supported by a rectangularly shaped (in cross-section) Teflon support seal and the other elastomeric seal is supported by a t-shaped (in cross-section) Nylatron® support seal. When the female half of the coupling is pressurized, pressure will be applied equally to the seals and to the parts of female half such that the net separation force is minimized. Typically the user will select one half of the coupling disclosed herein for use with pressure applied thereto. However, the user may use both halves of the coupling disclosed herein if so desired. The female half may include a pintle having a passageway which communicates with a chamber that, when pressurized, operates a check valve enabling a larger dump of fluid and pressure from the male half to the female half. The male half of the coupling includes a ball housing affixed to a moveable valve. The ball housing includes a first passageway and a ball aperture. The ball housing-valve assembly creates a second passageway. When the male half engages a female half the ball housing is urged against the force of a spring opening the ball aperture and establishing communication between the pressurized male half and the female half without affecting the main seal of the male half.

10 Claims, 11 Drawing Sheets

BALANCED COUPLING WITH PRESSURE BLEED

FIELD OF THE INVENTION

The invention is a coupling which may be connected with pressure on the female half or pressure on the male half. Pressure will be applied to either half but not both. The female half employs a balanced seal arrangement. Each elastomeric seal of the female half has a companion support seal. One elastomeric seal of the female half has a companion rectangularly shaped (in cross-section) Teflon support seal and the other elastomeric seal has a companion t-shaped (in cross-section) Nylatron® support seal.

The male half of the coupling includes a ball housing affixed to a moveable valve. The ball housing includes a first passageway and a ball aperture. The ball housing-valve assembly creates a second passageway. When the male half engages a female half the ball in the ball housing is urged against the force of a spring opening the ball aperture and establishing communication between the pressurized male half and the female half without affecting the main seal of the male half.

The invention is typically used on agricultural implements such as tractors or smaller versions thereof. Tractors include hydraulic pumps which run hydraulically driven equipment which may or may not be directly affixed to the tractor. If the driven piece of equipment is not affixed to the tractor it is disconnected by a coupling and is left to sit outside unprotected from the elements. Ambient heat from the air and radiant heat from the sun can and does cause the fluid in the disconnected driven piece of equipment and its connecting lines to increase in temperature and pressure thus making it difficult to connect the hydraulic pressure source to the hydraulic load (driven equipment).

BACKGROUND OF THE INVENTION

U.S. Pat. No. 4,077,433 to Maldavs illustrates a piston valve arrangement with a passageway through the valve to assist in assuring that the male ball valve remains open in high flow conditions from the male to the female. U.S. Pat. No. 4,881,573 to Durant illustrates a coupler having two poppet valves. The first poppet engages a ball check valve formed in the male coupling and the second poppet is actuated by a manually operated cam. A passageway exists in the piston to allow fluid to be vented or to pressurize the female valve.

U.S. Pat. No. 4,598,896 to Maldavs illustrates a coupler having a spool and a port within the spool. An annular seal is fixedly positioned about the port in the spool. The spool is slidable with respect to the seal which enables pressure to be relieved in the female during coupling and uncoupling with the male. U.S. Pat. No. 4,303,098 to Shindelar discloses a coupler having a female half which includes a female valve having an elongated stem for engaging the male half. The female half of the coupling is vented by a pivotable cam which moves the inner member of the female half to release its locking means and then opens a poppet valve to open the outlet port.

U.S. Pat. No. 4,249,572 to Shindelar et al. discloses a female half which is self-relieving. The female half includes dual poppet valves which are linked together. One of the poppet valves vents the female half of the coupling when the male and female valves are disengaged and uncoupled.

International Publication WO 98/19097 published May 7, 1998 and filed Oct. 17, 1997 by applicant STUCCHI S. R. L. discloses a male half of the coupling in FIG. 1 thereof which includes a seal 40 carried in a fixed body 32, a piston 37, a safety valve 37 abutting an inner element 34, and, a relief valve 46 being a ball valve 46 actuated by pin 45 for venting to chamber 48. U.S. Pat. No. 5,592,970 to Stucchi et al. issued Jan. 14, 1997 discloses structure similar to WO 98/19097 except the relief valve and pin are missing. The '970 patent is directed to preventing the blowout of seal 40 by covering it with bush 10.

The structure disclosed in WO 98/19097 will leak by the ball valve 46 and the interface between valve 73 and inner body member 34 at low pressures, for example, below 500 psig. Leaking around valve 46 and the interface negates the purpose of the relief valve 46 as the volume available will be filled. Leakage may occur at pressures greater than 500 psig but the increased pressures tend to enhance the metal to metal seals employed by STUCCHI S. R. L. in WO 98/19097.

U.S. Pat. No. 3,498,324 to Breuning discloses secondary valves which first engage each other and open causing a flow through the secondary flow passages from the high pressure side to the low pressure side of the coupling.

U.S. Pat. No. 5,159,955 to Ekman discloses a pressure reducing and bleed means located between two chambers 25 and 26 in a coupling half.

U.S. patent application Ser. No. 09/020,447 to applicant Dennis Zeiber, assigned to Snap-Tite Technologies, Inc. discloses and claims a relief valve positioning member in the female half which includes a relief valve to enable easy coupling when the female member is pressurized. U.S. patent application Ser. No. 09/037,461, a continuation-in-part of Ser. No. 09/020,447 just mentioned discloses and claims a relief valve engaging the body of the female valve.

U.S. Pat. Nos. 5,063,965 and 5,072,755 both to Wilcox and assigned to Snap-Tite Technologies, Inc. disclose balanced couplings employing metal seals. U.S. Pat. No. 5,730,185 to Wilkins et al. and assigned to Snap-Tite Technologies, Inc. discloses the connection of a dispenser half to a receptacle half by an operator using a single hand. Similarly, the dispenser half may be disconnected from the receptacle half using a single hand. Disconnection requires first that the pressure in the dispenser half be vented to an accumulator which permits the unlocking of the dispenser half from the receptacle half. Next the dispenser half is separated from the receptacle half by the operator using a single hand.

U.S. Pat. Nos. 5,415,440 and 5,664,832 to Kanao et al. disclose a t-shaped seal material which fits in troughs of spiral pipe as shown in FIG. 6 of either patent. U.S. Pat. No. 5,429,553 to Schoeps discloses t-shaped seal members 12, 13 for use in a hydraulic motor. U.S. Pat. No. 4,533,115 to Lissau discloses a t-shaped seal 38 for use in gladhand coupling applications.

None of the related art, however, discloses a female coupling half which vents into the male half during coupling, protects the seals in the male half of the coupling, and is substantially pressure balanced. Nor does any of the related art disclose a male half of the coupling which vents by way of a series of passageways and an aperture in a ball housing so as to protect the seals in the male half of the coupling during engagement with the female half of the coupling.

SUMMARY OF THE INVENTION

It is an object of the present invention to provide a female coupling half which is pressure balanced and will easily connect with pressure applied to the female coupling half.

It is an object of the present invention to provide a female coupling half which includes two seals which prohibit leakage past communicating ports in the internal parts thereof. Each seal has a companion support seal. In the case of one seal, a rectangularly-shaped (in cross-section) support seal made of Teflon is employed. The other seal has a companion t-shaped (in cross-section) support seal. The t-shaped support seal is permitted to float with respect to the cavity in which it resides. Contours on the t-shaped support seal cooperate with beveled edges of the ports in the sliding sleeve. The float of the t-shaped support seal is limited so as to not interfere with movement of the sliding sleeve with respect to the t-shaped retainer.

It is an object of the present invention to provide a female coupling half which vents pressure to the male coupling half without damaging the seals of the male body.

It is an object of the present invention to provide a pintle and a check valve in the female coupling half.

It is an object of the present invention to provide two seal assemblies in the female half each including an elastomeric seal and a support seal. The support seals disclosed are rectangularly shaped in one case and t-shaped in the other case. It will be recognized by those having skill in the art that the t-shaped support seal is disclosed by way of example only and that many different shapes of the support seal may be used. Instead of using the t-shaped support seal, many different contours may be used without departing from the spirit and the scope of this invention.

It is an object of the present invention to provide a female coupling half which includes a sliding sleeve having ports with beveled or chamfered edges.

It is an object of the present invention to provide pressure balanced seals in the female half of the coupling.

It is an object of the present invention to provide a male coupling half which includes two passageways in series and a ball housing aperture for venting a pressurized male coupling half.

It is an object of the present invention to provide a ball housing affixed to the valve in the male half of the coupling.

It is an object of the present invention to provide first and second passageways which cooperate with an aperture in a ball housing for venting pressure in the male half of the coupling.

It is an object of the present invention to provide a ball housing, ball and spring in the male half of the invention. The spring is operable between the ball housing and the ball and the ball seals an aperture in the ball housing.

It is an object of the present invention to provide a female half of the coupling which includes a flush face which engages a ball housed in a ball housing of the male half of the coupling. The ball, under the urging of a spring, seals a ball aperture in the ball housing. When the face of the female engages the ball the ball moves away from the aperture opening the aperture and permitting communication between the aperture and first and second passageways in the male half of the coupling.

It is an object of the present invention to vent the male half of the coupling when pressurized without damaging the seals of the male coupling.

It is an object of the present invention to vent the male half of the coupling into the female half of the coupling.

It is an object of the present invention to vent the female half of the coupling into the male half of the coupling without damaging the seals in the male half of the coupling.

It is an object of the present invention to provide a pintle in the female half of the coupling which includes a passageway for venting from a first chamber to a second chamber and past a check valve.

A coupling having two coupler halves, a female half and a male half is disclosed. Pressure will be applied to either half but not both. The female half employs a balanced seal arrangement. Each elastomeric seal of the female half is supported by a support seal. One elastomeric seal of the female is supported by a rectangularly shaped (in cross-section) Teflon support seal and the other elastomeric seal is supported by a t-shaped (in cross-section) Nylatron® support seal. The Teflon support seal also functions as a seal and reduces friction. The t-shaped support seal also functions as a seal as will be explained hereinbelow. When the female half of the coupling is pressurized, pressure will be applied equally to the seals and to the parts of female half.

Typically a user will only employ one half of the coupling disclosed herein in combination with a standard, and less expensive, coupling half. Typically the user will select one half of the coupling disclosed herein for use with pressure applied thereto. However, the user may use both halves of the coupling disclosed herein if so desired. The female half may include a pintle having a passageway which communicates with a chamber that, when pressurized, operates a check valve enabling a larger dump of fluid and pressure from the male half to the female half. This is necessary because the pressure and fluid is transferred from the male coupling half to the female coupling half before the coupling is fully coupled and communication is established to the flow passageway in the female half of the coupling.

The male half of the coupling includes a ball housing affixed to a moveable valve. The ball housing includes a first passageway and a ball aperture. The ball housing-valve assembly creates a second passageway. When the male half engages a female half the ball in the ball housing is urged against the force of a spring opening the ball aperture and establishing communication between the pressurized male half and the female half without affecting the main seal of the male half.

BRIEF DESCRIPTION OF THE DRAWINGS

FIG. 1 also illustrates a passageway in the pintle and a check valve.

FIG. 3 illustrates a pintle which does not include a passageway therethrough.

FIG. 10 does not correspond to any other drawing view.

DESCRIPTION OF THE INVENTION

Figure 1:
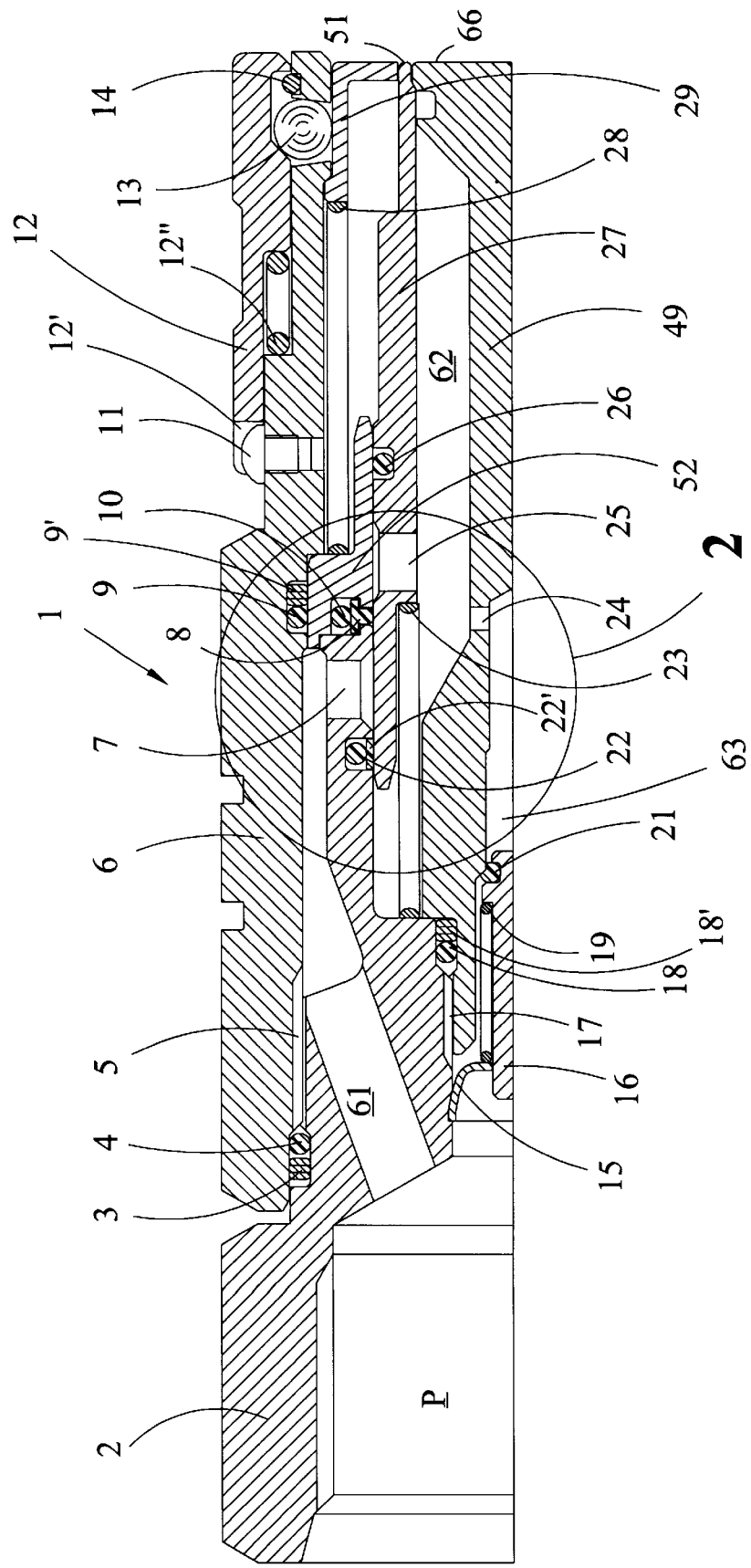
FIG. 1 is a cross-sectional view of the female half of the coupler with pressure applied thereto.
Figure 3:
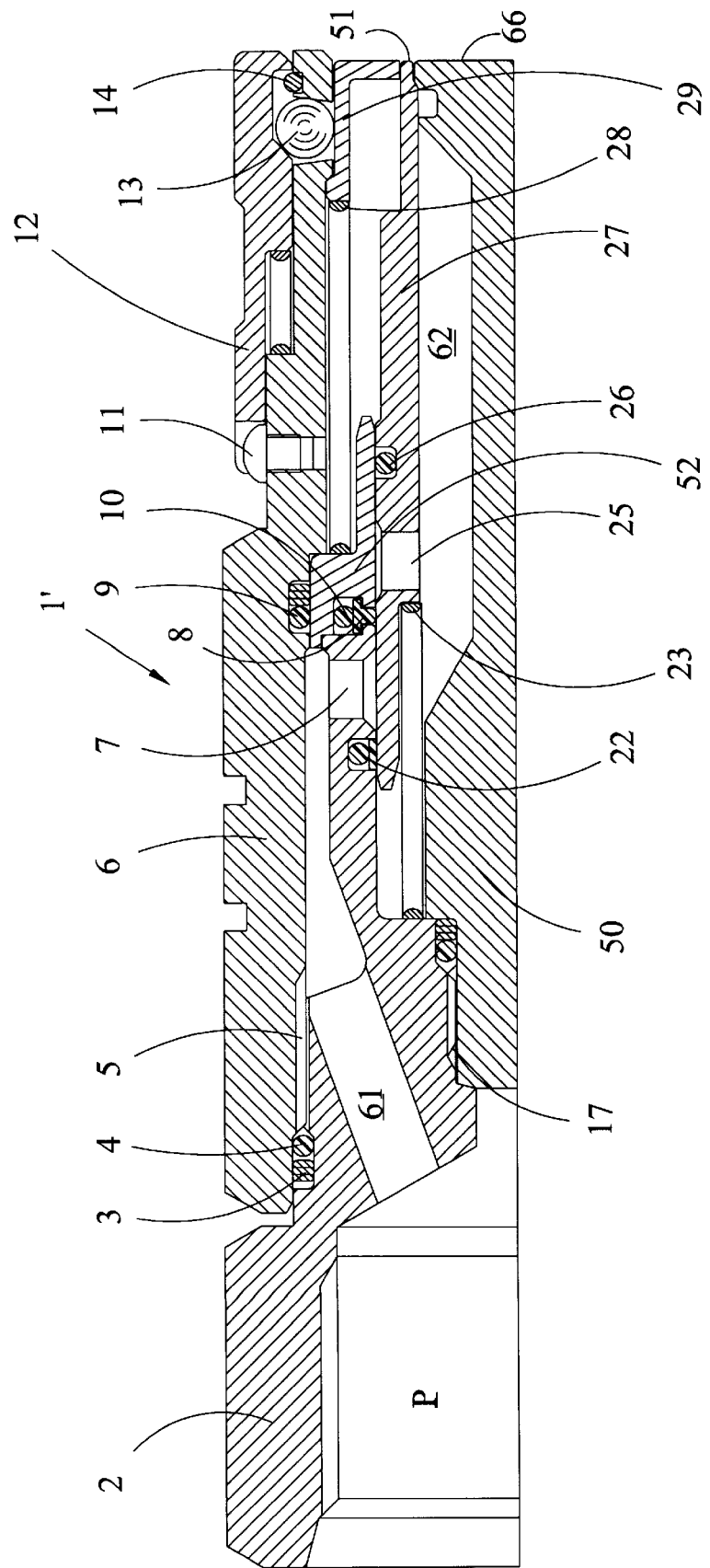
FIG. 3 is a cross-sectional view of the female half of the coupler similar to the view illustrated in FIG. 1 except the check valve illustrated in FIG. 1 is not included.

FIG. 1 is a cross-sectional view of the female half 1 of the coupler with pressure applied thereto as indicated by the letter P on the drawings. The female half 1 includes the adaptor 2, body 6, sliding sleeve 27, pintle 49, flush face sleeve 29, locking sleeve 12, seal gland (or retainer) 52 and check valve 16. The check valve 16 is an option and would only be supplied if a customer used both the male 30 and the female 1 halves of the coupling. Ordinarily a customer will use the female 1' as illustrated in FIG. 3 which does not include a check valve. Pintle 50 of the female half of the coupling in FIG. 3 includes a passageway. The female 1 having a check valve 16 (FIG. 1) is only used in conjunction with the male half 30 disclosed herein or its equivalent.

Adaptor 2 is affixed to body 6 and seal-packing assembly 4,3 ensures that no fluid is leaked by the threaded interconnection 5. Seals 9 and packing 9' prevent leakage between the seal gland 52 and the body 6. Reference numeral 7 signifies one of several circumferentially located ports in the adaptor 7 which communicates with flow passageway 61. Reference numeral 25 signifies one of several circumferentially located ports in the sliding sleeve 27.

Pintle 49 is affixed by a threaded interconnection 17 to the adaptor 2. Pintle 49 includes a passageway 24 which enables communication between a first chamber 62 and a second chamber 63. Spring 19 operates between a shoulder on check valve 16 and the spring support 15. Seal 18 and packing 18' ensure no leakage past the pintle-adaptor interconnection. Seal 21 resides in a groove in check valve 16 and seals between the check valve 16 and the pintle 49 when the check valve is closed as shown in FIG. 1. When the check valve is pressurized, for example, when the second chamber 63 is pressurized, it moves leftwardly when viewing FIG. 1. First chamber 62 is generally bounded by pintle 49 and sliding sleeve 27. Seal 26 seals between the sliding sleeve 27 and the adaptor 2.

Figure 7:
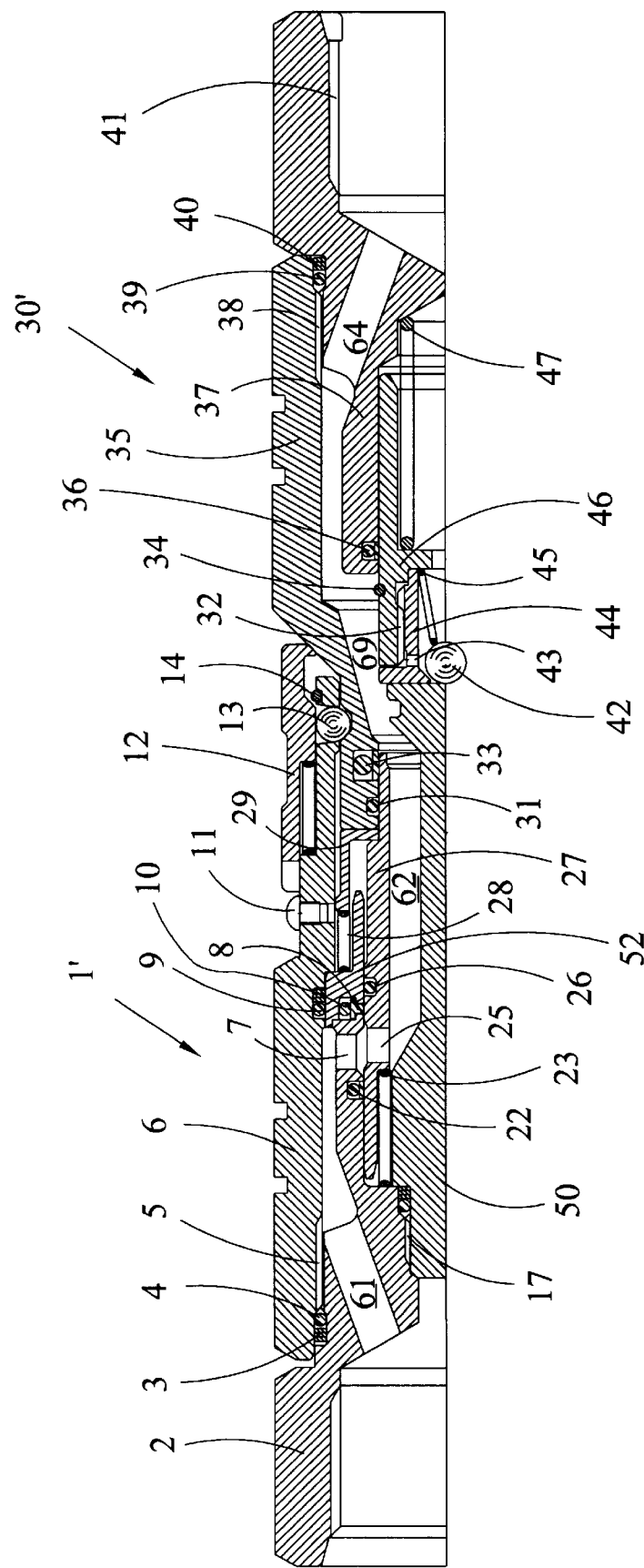
FIG. 7 is a cross-sectional view of the male half and the female half of FIG. 3 coupled together.
Figure 8:
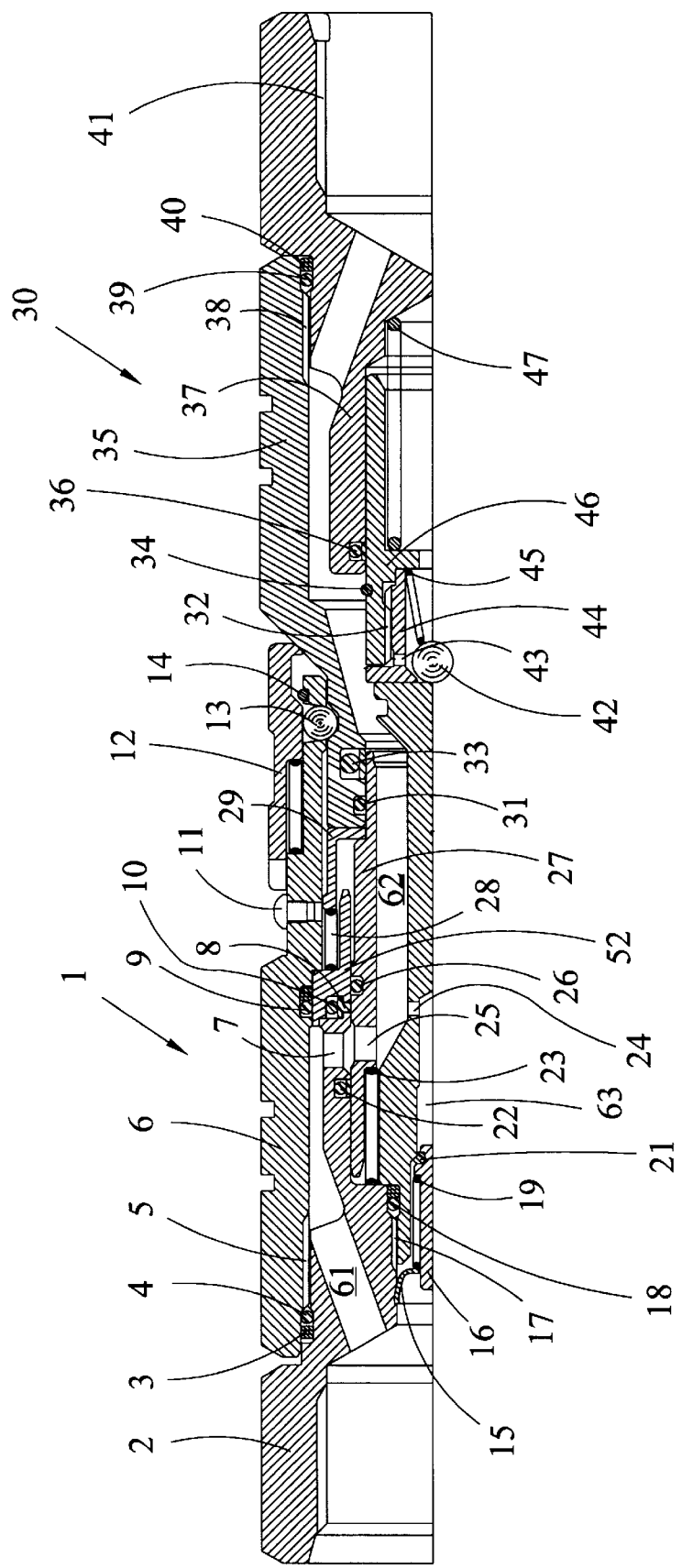
FIG. 8 is a cross-sectional view of the male half and the female half of FIG. 1 coupled together.

Spring 23 is operable between sliding sleeve 27 and adaptor 2. Spring 28 is operable between the seal gland 52 and the flush face sleeve 29. Locking sleeve 12 includes a slot 12' which in combination with threaded screw 11 ensures that the coupling is not unintentionally disconnected once coupled together. See, FIGS. 7 and 8. Spring 12" operates between body 6 and locking sleeve 12. Snap ring 14 prevents over travel of locking sleeve 12.

Locking sleeve 12, in combination with locking balls or detents 13 and a groove in the body of the male, secures the coupling together. See FIGS. 7 and 8. Pintle 49 includes face 66 for engagement with a corresponding face 48' of the ball retainer 44 of the male half during engagement of the coupling halves. Sliding sleeve 27 includes a face 51 which also engages face 48' of the ball retainer 44 of the male half 30.

Figure 2:
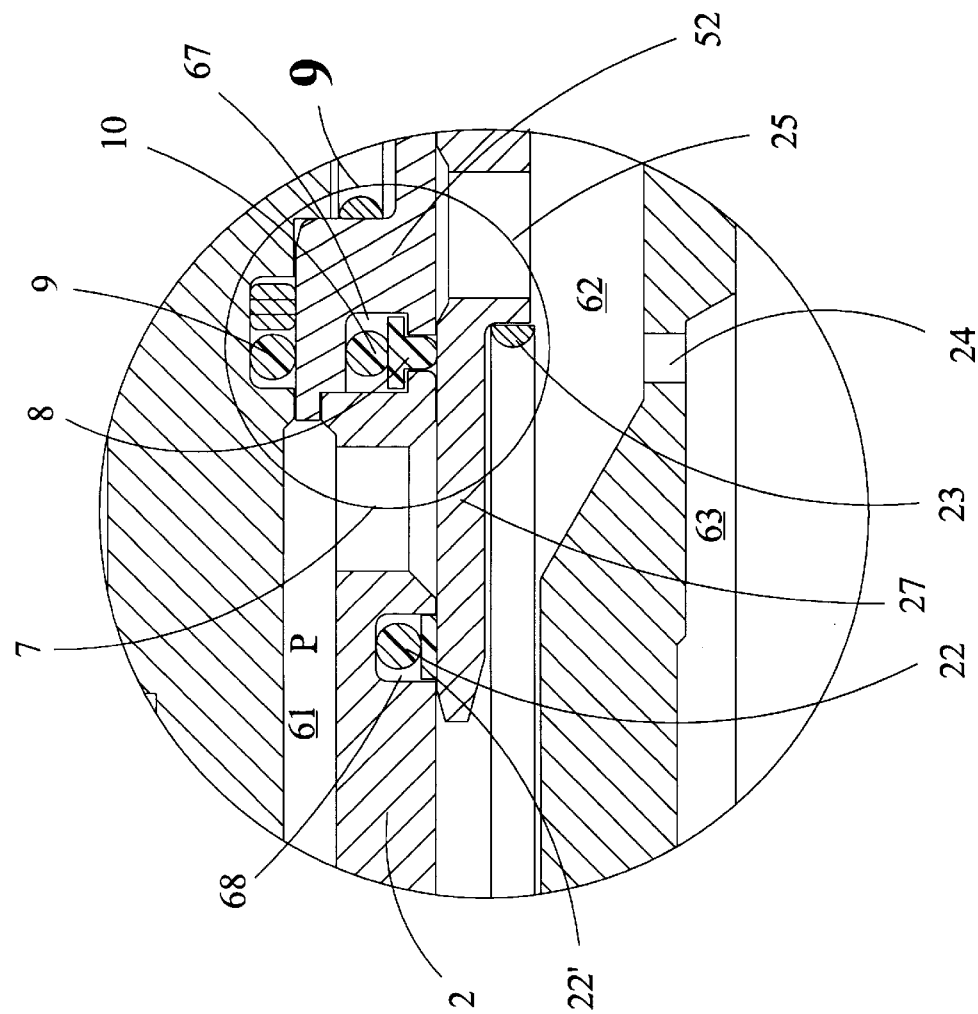
FIG. 2 is an enlarged portion of FIG. 1 illustrating one of several ports in the adaptor and one of several ports in the sliding sleeve. One elastomeric seal has a companion rectangularly shaped teflon support seal and one elastomeric seal has a companion Nylatron® t-shaped support seal. Those skilled in the art will recognize that materials other than teflon and Nylatron® may be used. For instance, Delrin® or PEEK may be used. PEEK is an abbreviation for polyetherketone and Delrin® is a homopolymer acetyl material and a registered trademark of E. I. Dupont de Memours Nemours of Wilmington Del. Nylatron® is a trademark of The Polymer Corporation of Reading, Pa. Nylatron® is a molybdenum disulfide filled nylon material.
Figure 9:
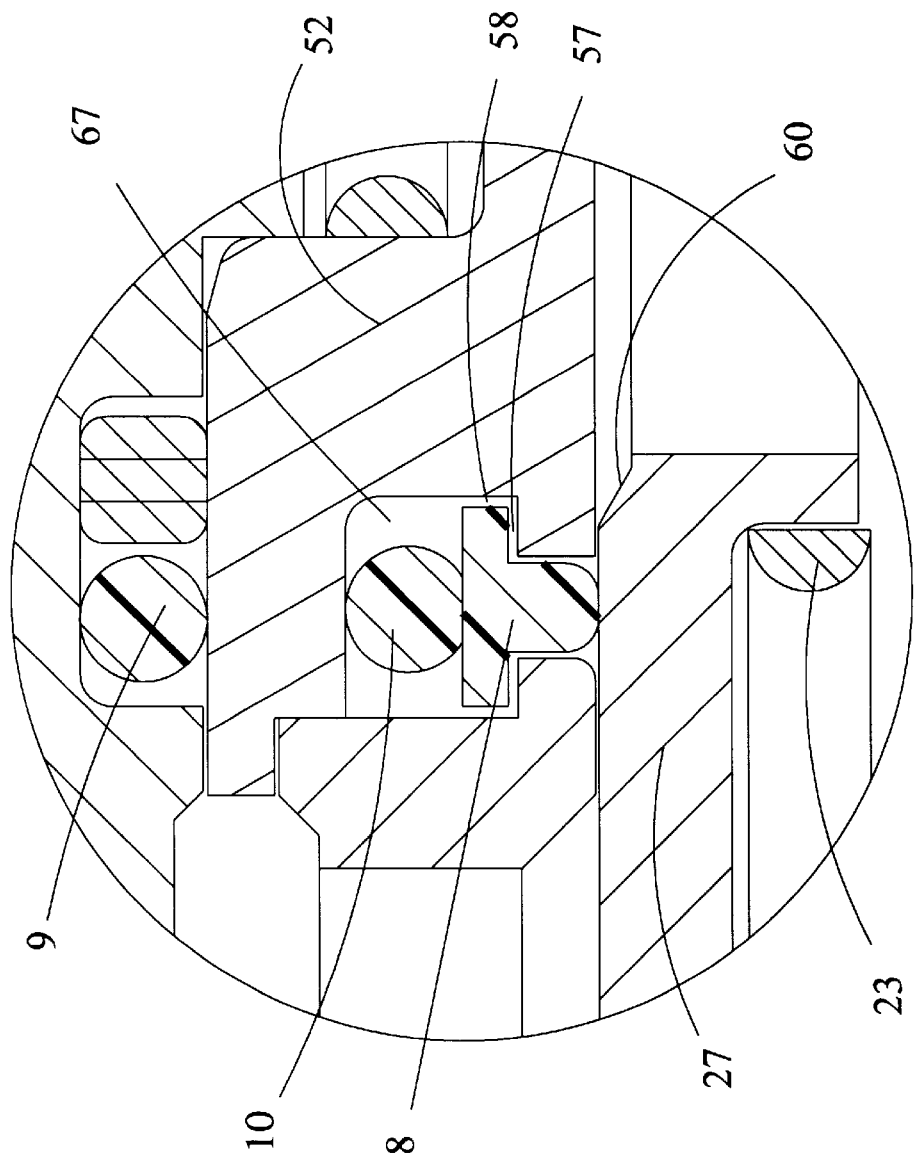
FIG. 9 is an enlarged portion of FIG. 2 illustrating gaps between the t-shaped Nylatron® seal and the retainer and the adaptor.

Of considerable importance to the instant invention are the seal assemblies 22', 22 and 10, 8. FIG. 2 is an enlarged portion of FIG. 1 which better illustrates the seals and their corresponding support seals. Seal-support seal assembly 22, 22' is always in engagement with sliding sleeve 27. However, seal-support seal assembly 10, 8 is not always in engagement with the sliding sleeve 27. FIG. 9 illustrates that the t-shaped support seal 8 floats within the annular space 67 bounded by the seal gland 52 and the adaptor 2. The t-shaped (in cross-section) support seal 8 floats vertically (or transversely) as evidenced by gap 57 and it also floats longitudinally as evidenced by gap 58. Referring to FIG. 9, longitudinally is left-right and transversely (or vertically) is up-down.

Gap 57 is a smaller distance than the depth of the transverse beveled edge 60 of the sliding sleeve 27. Elastomeric seal 10 is always compressed due to the dimension of the annular space 67. Those skilled in the art will readily recognize that the support seal 8 may be in shapes other than the preferred t-shape (in cross-section). Those skilled in the art will also appreciate that the support seal 22' may be in a shape other than the preferred rectangular cross-section. Those skilled in the art will also appreciate that the seals discussed herein seal the circumferential ports of the adaptor 2 and the sliding sleeve 27.

Referring to FIG. 9, the sealing surfaces are between the t-shaped support seal 8 and the sliding sleeve 27, the t-shaped support seal 8 and the o-ring seal 10, and the o-ring 10 seal and the seal gland 52. The preferred material of the support seal 8 is Nylatron®. Other materials such as PEEK (polyetherketone) or Delrin® may be used for either support seal 8 or 22'.

Referring to FIG. 2, the preferred material of the support seal 22' is Teflon and the seal 22 is elastomeric. Seal assembly 22', 22 resides in an annular space 68 bounded by the adaptor 2 and the sliding sleeve 27. Sealing takes place between support seal 22' and sliding sleeve 27, the support seal 22' and the elastomeric seal 22, and the elastomeric seal 22 and the adaptor 2. See FIG. 2. Those skilled in the art will readily recognize that support seal 22' may be a shape other than rectangular as shown in cross section.

Seal assemblies 22', 22 and 8, 10 are pressure balanced. Fluid and, hence, pressure will migrate along the surfaces of the sliding sleeve 27 and the adaptor 2 and will proceed in the proximal gaps between the support seals 22' and 8 and the adaptor and will pressurize the seals 22 and 10. See FIGS. 2 and 9.

Figure 10:
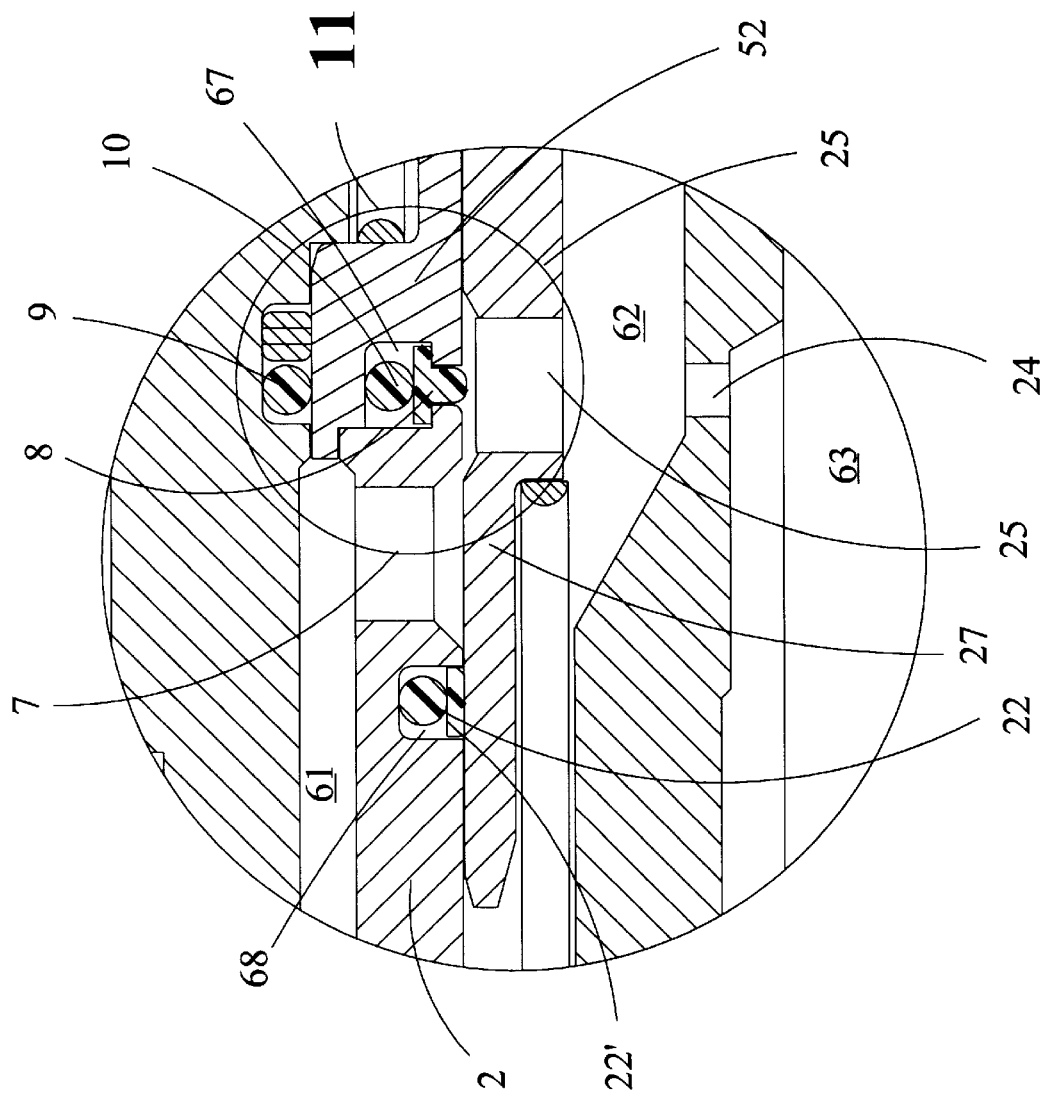
FIG. 10 is an enlarged view of the t-shaped Nylatron® seal aligned over port 25 of sliding sleeve 27.
Figure 11:
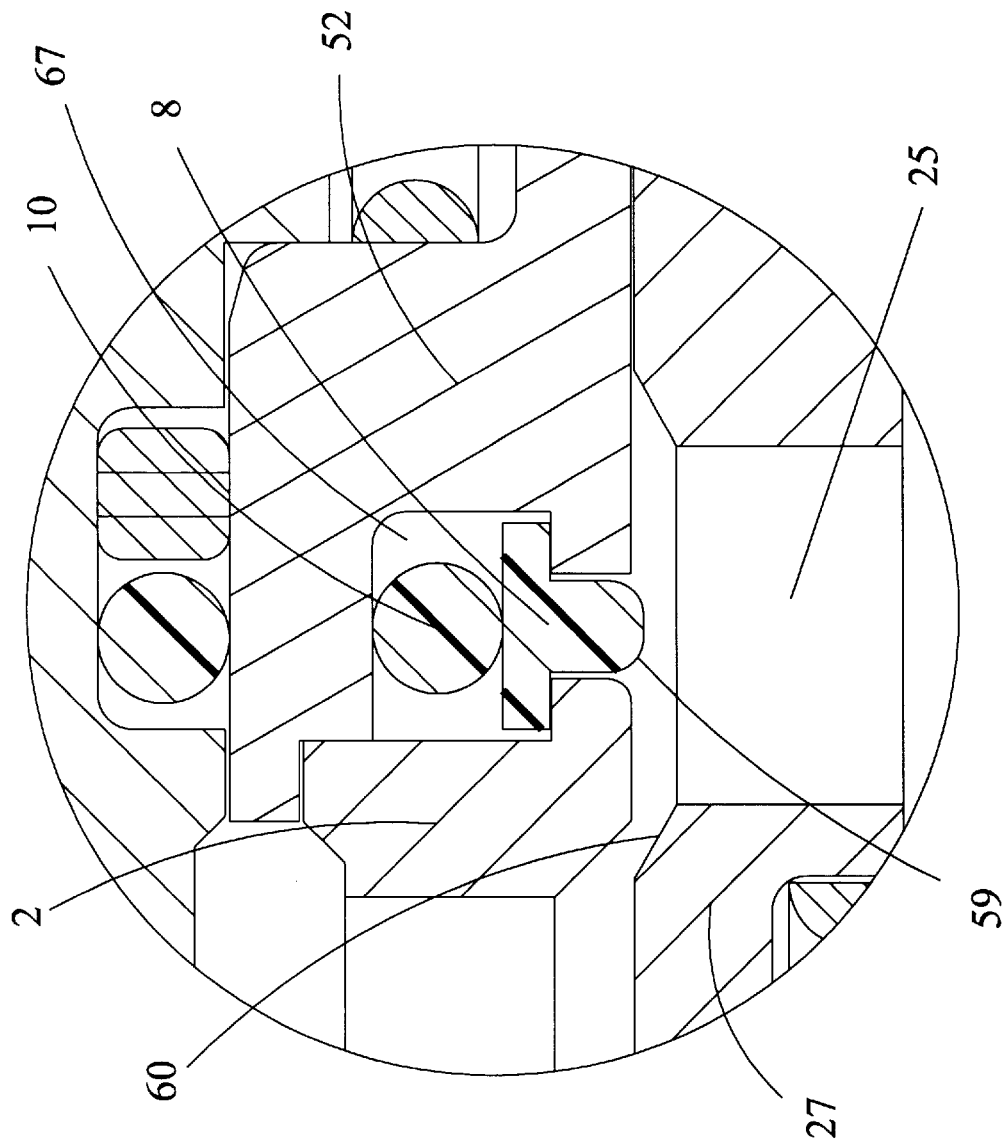
FIG. 11 is an enlargement of a portion of FIG. 10.

Referring to FIG. 10, the sliding sleeve is illustrated such that it has progressed leftwardly during the coupling process. FIG. 10 does not correspond to any other drawing figure. As shown in FIG. 10, the shoulders of the t-shaped support seal 8 are flush against the corresponding shoulders of the adaptor 2 and the seal gland 52. In other words, the gap 57 is not present in FIG. 10. FIG. 11 is a further enlargement of the seal assembly positioned over one of the ports 25 of the sliding sleeve. T-shaped support seal 8 includes rounded edges 59 which follow the profile of the beveled edge 60 of the port 25 as the port 25 traverses t-shaped support seal 8 during the coupling process. Since t-shaped support seal 8 does not extend the full depth of the beveled edge it does not create much friction as the port 25 proceeds across the support seal 8. Additionally, due to the contour of the beveled edge 60 of the port 25 and the contour 59 of the support seal, the support seal does not experience very much abrasion as it traverses the port 25 and its beveled edge 60. Still additionally, it will be appreciated by those skilled in the art that the seal 10, being an elastomeric seal, will flex as the support seal traverses the port 25 and beveled edge 60.

FIG. 3 is a cross-sectional view of the female half of the coupler similar to the view illustrated in FIG. 1 except the check valve 16 illustrated in FIG. 1 is not included. FIG. 3 illustrates a pintle 50 which does not include passageway therethrough. When the female half as illustrated in FIG. 3 is coupled with the male half, pressure existing in the adaptor, hose and equipment upstream from the female coupling is bled into the male half of the coupling along the flow passageway represented by reference numerals 61, 62, 69 and 64 which enables the easy coupling or joining of the two halves. See FIG. 7.

Figure 4:
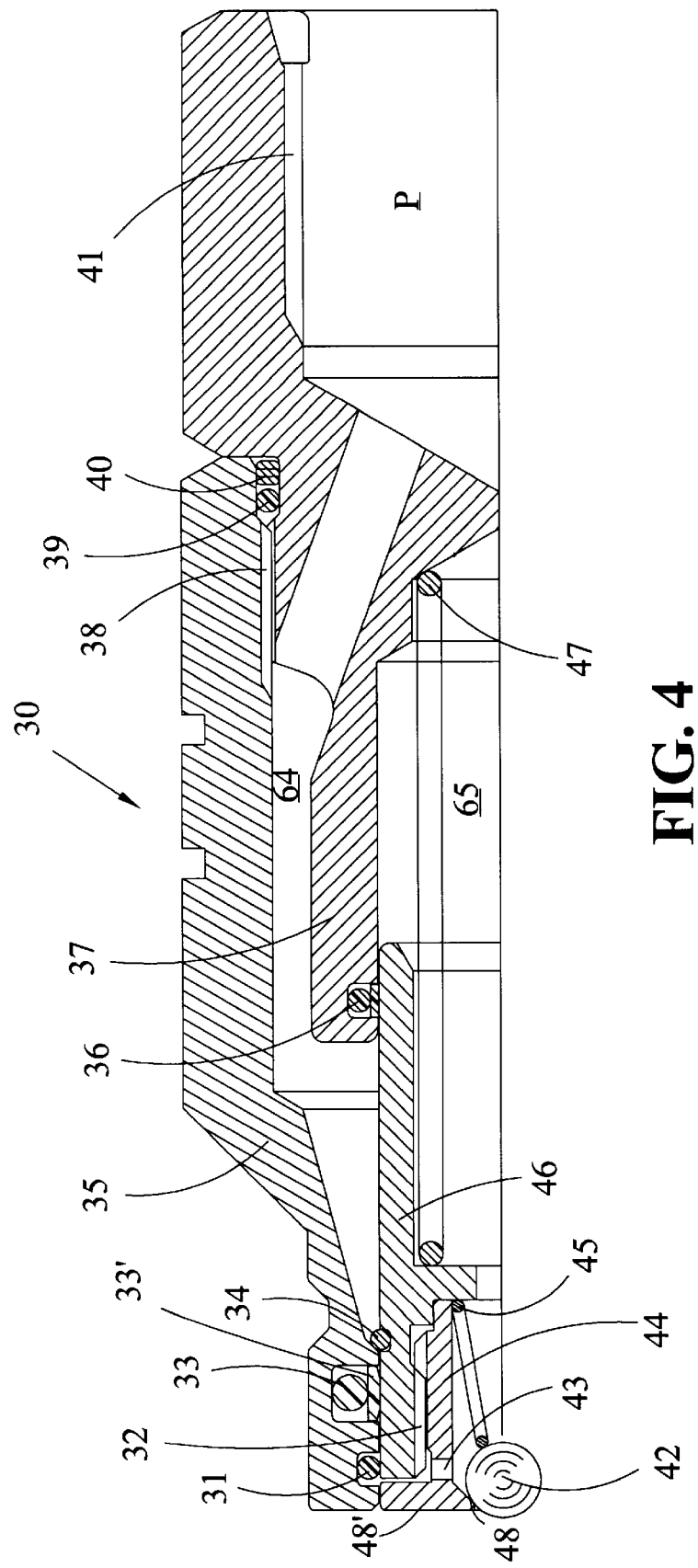
FIG. 4 is a cross-sectional view of the male half of the coupler.

Referring to FIG. 4, the male half 30 of the coupling is illustrated. The male half 30 additionally includes a chamber 65 in the male half which acts as a reservoir or volume in which to vent pressurized fluid stored upstream of the male half during coupling. Body 36 is affixed by a threaded interconnection 38 to the adaptor 37. Seal-packing assembly 39, 40 prohibits leakage between the body and the adaptor. Threaded adaptor 41 may be secured to a plurality of hoses and or other connections.

Spring 47 is operable between the adaptor 37 and the valve 46. Spring 45 is operable between the ball housing 44 and ball 42. Ball 42 protrudes outwardly from ball housing 44. See FIGS. 4 and 6. Ball housing 44 is threaded 32 to valve 46 and includes a first passageway 43 in communication with a gap between the ball housing and the valve 46. Ball housing 44 includes an aperture 48. Ball housing 44 is threaded to valve 46 and bottoms out on valve 46 creating a gap or passageway 70, sometimes referred to as a second passageway 70, between the valve and the ball housing. Ball housing 44 includes a flush face 48'. Body 35 includes a main seal assembly 33, 33' and a backup seal 31 which is an o-ring. The main seal includes a beveled teflon support seal 33' and an elastomeric o-ring seal. Chamfers 55 and 56 on support seal 33' enable sliding sleeve 27 to easily traverse the support seal 33'.

Figure 5:
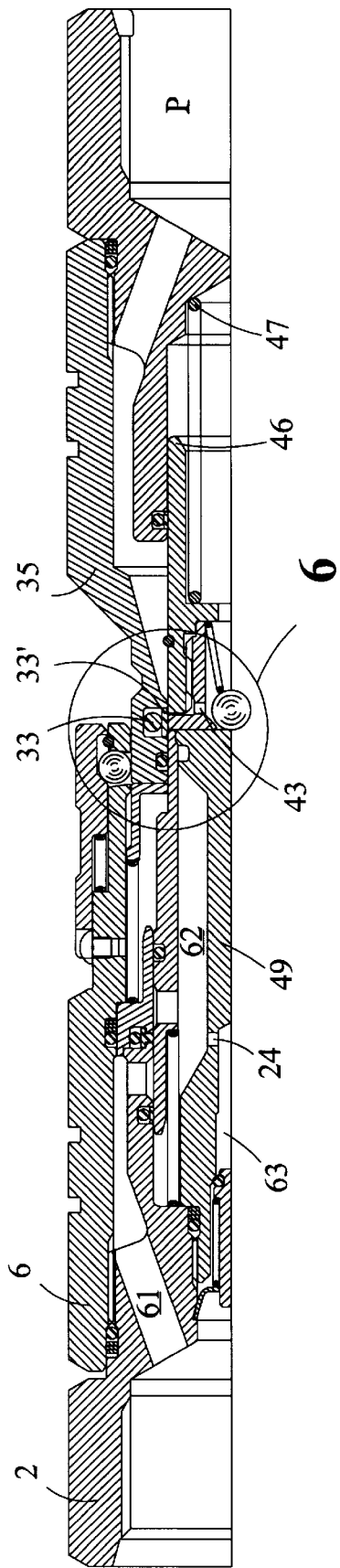
FIG. 5 is a cross-sectional view of the pressurized male half partially engaging the female half.
Figure 6:
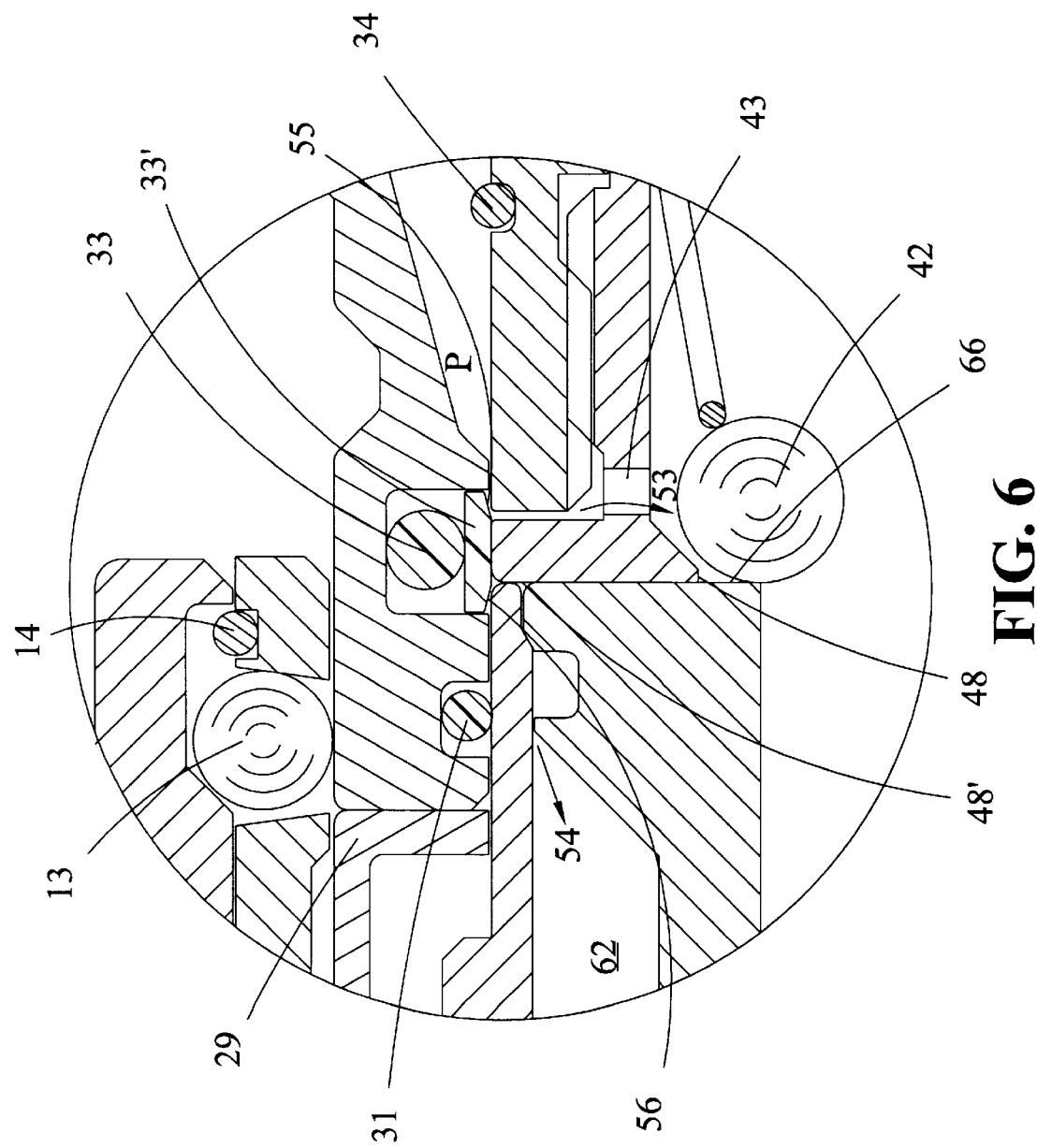
FIG. 6 is an enlarged portion of FIG. 5 illustrating the protection of the main seal and direction of the flow away from the main seal.

FIG. 5 is a cross-sectional view of the pressurized male half partially engaging the female half. FIG. 6 is an enlarged portion of FIG. 5 illustrating the protection of the seal 33 and direction of the flow away from the seal-support seal assembly 33,33'. Reference numeral 53 represents the direction of the flow from pressure source P by and through aperture 48 in ball housing 44. Pressure and fluid migrates along the interface of the pintle 66 and the ball housing 48' and along the interface of the pintle and the sliding sleeve as represented by reference numeral 54. In this way the seal assembly 33, 33' is protected and pressure is diverted away from it.

It will be recognized by those skilled in the art that many changes and modifications may be made to the invention without departing form the spirit and scope of the appended claims.

We claim:

1. A coupler half comprising:

a flow passageway having a port;

a sliding sleeve having a port;

a first elastomeric circumferential seal;

a second elastomeric circumferential seal;

a first rectangularly shaped in cross section support seal for supporting and retaining said first elastomeric seal; and, a second t-shaped in cross section support seal for supporting and retaining said second elastomeric seal.

2. A coupler half as claimed in claim 1 wherein said sliding sleeve is moveable with respect to said support seals and said second t-shaped in cross section support seal which supports and retains said second elastomeric seal is moveable in response to movement of said sliding sleeve.

3. A coupler half as claimed in claim 2 wherein said sliding sleeve includes a contoured exterior and where said t-shaped support seal is transversely moveable in response to said movement of said sliding sleeve and said contour of said sliding sleeve.

4. A coupler half as claimed in claim 3 wherein said support seal of said first circumferential seal is Teflon.

5. A coupler half as claimed in claim 3 wherein said t-shaped support seal of said second circumferential seal is a molybdenum disulfide filled nylon.

6. A coupler half as claimed in claim 3 wherein said t-shaped support seal of said second circumferential seal is a homopolymer acetyl material.

7. A coupler half as claimed in claim 3 wherein said t-shaped support seal of said second circumferential seal is a polyetherketone material.

8. A coupler half as claimed in claim 1 wherein said first and second circumferential seals are pressure balanced.

9. A coupler half as claimed in claim 1 wherein said coupler half is a female coupler half.

10. A coupler half as claimed in claim 1 wherein said first and second seals are O-rings.

* * * * *

UNITED STATES PATENT AND TRADEMARK OFFICE
CERTIFICATE OF CORRECTION

PATENT NO. : 6,145,539　　　　　　　　　　　　　　　　　　　　　　　Page 1 of 1
DATED : November 14, 2000
INVENTOR(S) : Wayne Wilcox It is certified that error appears in the above-identified patent and that said Letters Patent is hereby corrected as shown below:

Column 4,
Line 51, delete "Memours", and insert -- Nemours --.

Signed and Sealed this

Second Day of October, 2001

*Attest:*

*Nicholas P. Godici*

*Attesting Officer*　　　NICHOLAS P. GODICI
　　　　　　　　　　*Acting Director of the United States Patent and Trademark Office*